Dec. 22, 1970  E. M. WOODFORD  3,548,679
OUTPUT TORQUE DIVIDER
Filed Oct. 29, 1968  2 Sheets-Sheet 1
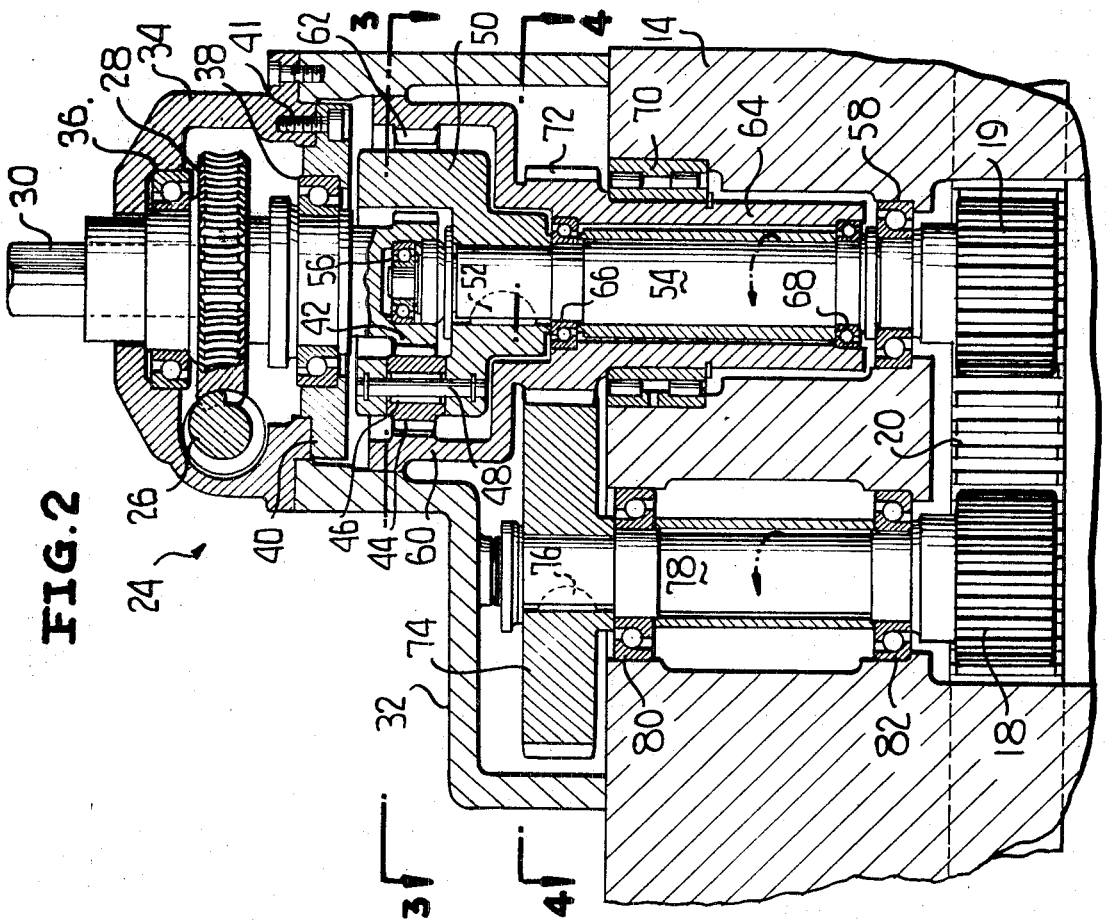
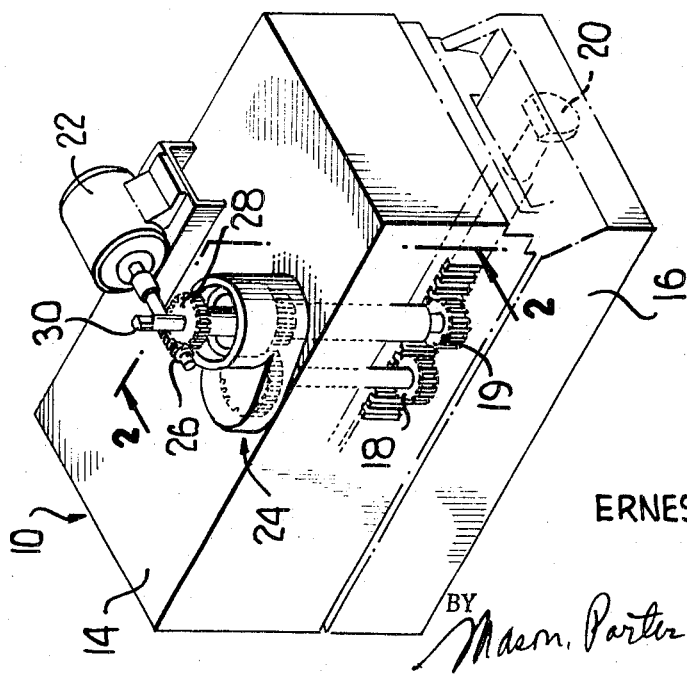
INVENTOR
ERNEST M. WOODFORD
BY Mason, Porter, Diller & Brown
ATTORNEYS Dec. 22, 1970  E. M. WOODFORD  3,548,679
OUTPUT TORQUE DIVIDER
Filed Oct. 29, 1968  2 Sheets-Sheet 2

*INVENTOR*
ERNEST M. WOODFORD

BY *Mason, Porter, Diller & Brown*
ATTORNEYS

United States Patent Office 3,548,679
Patented Dec. 22, 1970

3,548,679
OUTPUT TORQUE DIVIDER
Ernest M. Woodford, Waynesboro, Pa., assignor to Litton Industries, Inc., a corporation of Delaware
Filed Oct. 29, 1968, Ser. No. 771,396
Int. Cl. F16h 37/06, 57/00
U.S. Cl. 74—674                    10 Claims

ABSTRACT OF THE DISCLOSURE

This disclosure relates to a device for effecting relative movement between a rack and two driving gears. Each of the two driving gears is interconnected with an input torque through a system of gears which divides the input torque equally for transmission to the two driving gears. The system of gears which divides the input torque includes a sun gear and a plurality of planetary pinions. The rotation of the planetary pinions about their own axes imparts rotation to one of the two driving gears while the rotation of the planetary pinions about the sun gear imparts rotation to the other of the two driving gears.

---

This invention relates generally to a device for effecting relative movement between a rack and two driving gears, and more particularly, to a device for imparting an input torque to a rack by means of a torque divider which divides the input torque equally between two driving gears which are mounted in engagement with the rack for movement relative thereto whereby each of the driving gears is adapted to transmit an equally portion of the input torque to the rack.

One application of this invention would be in a machine tool having a tailstock or slide portion movable with respect to a bed portion by means of a gear and rack arrangement. In the past, in order to shift a heavy slide on a machine tool by means of a gear and rack arrangement, a relatively heavy tooth gear and rack had to be used in order to withstand the torque required to effect the relative movement.

It is, therefore, an object of this invention to provide a device capable of shifting a heavy slide on a machine tool by means of a gear and rack arrangement wherein a heavy tooth gear and rack is not required.

More specifically, it is an object of this invention to provide a device capable of shifting a heavy slide on a machine tool by means of a gear and rack arrangement wherein two or more gears having lighter teeth with a correspondingly lighter rack are substituted for the usual heavy tooth gear and rack arrangement.

It is a further object of this invention to provide a device for effecting relative movement between a rack and gears wherein the input torque necessary to effect such relative movement is equally divided between two driving gears whereby each of the driving gears is adapted to transmit an equal portion of the input torque to the rack.

With the above and other objects in view that will hereinafter appear, the nature of the invention will be more clearly understood by reference to the following detailed description, the appended claimed subject matter and the several views illustrated in the accompanying drawings:

In the drawings:

FIG. 1 is a perspective view of a machine tool wherein a torque divider formed in accordance with this invention may be utilized.

FIG. 2 is an enlarged vertical sectional view taken along line 2—2 of FIG. 1 and shows the details of the torque divider.

Figure 3:
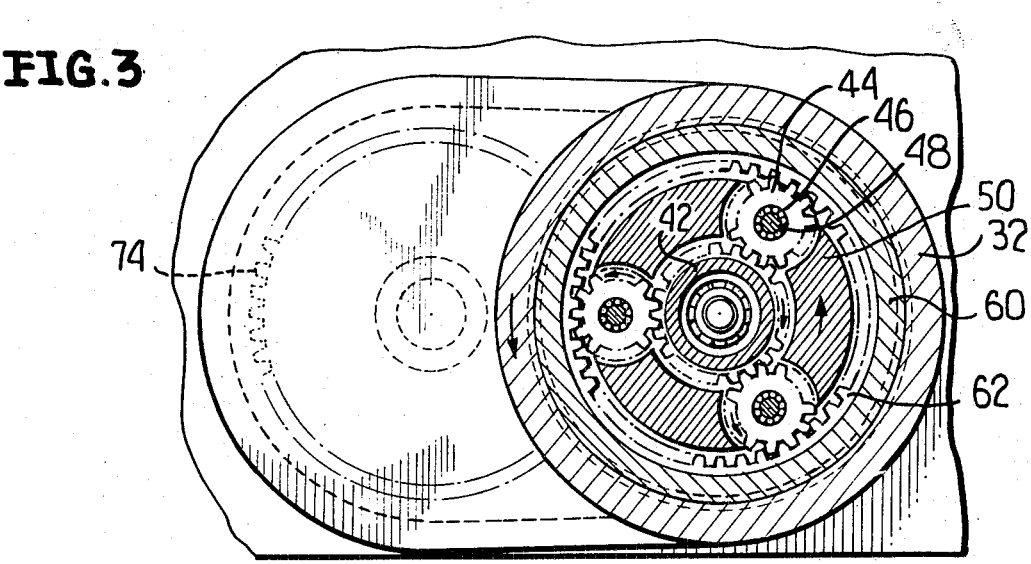
FIG. 3 is a sectional view taken along line 3—3 of FIG. 2.
Figure 4:
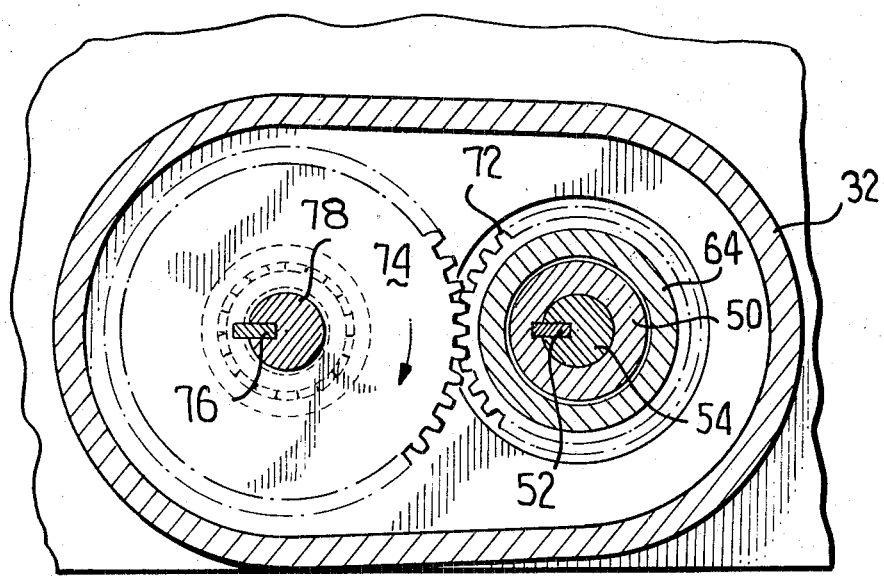
FIG. 4 is a sectional view taken along line 4—4 of FIG. 2.

Referring now to the drawings in detail, it will be seen that there is illustrated in FIG. 1 a machine portion generally referred to by the numeral 10 which provides one environment wherein a torque divider formed in accordance with this invention may be utilized. The machine portion 10 indicates a member of a grinding or other machine having a slide portion 14 which is slidably mounted on a bed portion 16. When it is desired to shift the position of a machine element (not shown) carried by the slide portion 14 relative to a workpiece (not shown), it is necessary to effect movement of the slide portion 14 relative to the bed portion 16. This is accomplished by means of a gear and rack arrangement.

A pair of driving gears 18 and 19, carried by the slide portion 14, are mounted in engagement with a rack 20 which is carried by the bed portion 16 and is restrained against axial movement relative thereto. The torque required to move the slide portion 14 relative to the bed portion 16 is transmitted to the driving gears 18 and 19 from a motor 22 through a torque divider generally indicated by the numeral 24. Torque from the motor 22 is transmitted to the torque divider 24 by means of a worm 26 which is engaged with a worm wheel 28 which is, in turn, keyed to a shaft 30.

As seen most clearly in FIG. 2, the portion of the torque divider 24 extending above the slide portion 14 is protected by a housing 32 having a cover plate 34. The shaft 30 is journaled in the housing 32 by means of bearings 36 and 38. The bearing 38 is supported in the housing 32 by means of a ring member 40 which is fixed relative to the cover plate 34 by means of screws 41.

The shaft 30 has a sun gear 42 formed integrally therewith at its lower end. The sun gear 42 engages a plurality of planetary pinions 44 (see FIG. 3) spaced about its periphery. The planetary pinions 44 are journaled by means of bearings 46 to shafts 48 which are carried by a carrier 50 which is, in turn, keyed by means of a key 52 to a shaft 54. The shaft 54 is journaled at its upper end to the interior of the sun gear 42 by means of a bearing 56 and it is further journaled at its lower end in the slide portion 14 by means of a bearing 58. The shaft 54 carries driving gear 19 at its lower end.

The planetary pinions 44 also engage an intermediate gear 60 having a set of internal teeth 62. Intermediate gear 60 has a lower portion 64 which is journaled on shaft 54 by means of bearings 66 and 68. The lower portion 64 of intermediate gear 60 is further journaled to the slide portion 14 by means of a roller bearing 70.

The lower portion 64 of intermediate gear 60 is further formed with a set of external teeth 72. The external teeth 72 engage a gear 74 which is keyed by means of a key 76 to a shaft 78. The shaft 78 is journaled in the slide portion 14 by means of bearings 80 and 82. The shaft 78 carries the driving gear 18 at its lower end.

In operation, when it is desired to move the slide portion 14 relative to the bed portion 16 the motor 22 is energized to impart an input torque through the worm 26 to the form wheel 28. The worm wheel 28 imparts the input torque to the shaft 30 to which it is splined. Assuming that the shaft 30 and its integrally formed sun gear 42 are rotating in a clockwise direction as viewed in FIG. 3, the planetary pinions 44 which are engaged by the sun gear 42 will be rotating in a counter clock-wise direction about their own axes. The planetary pinions 44 will, inturn, engage the internal teeth 62 of the intermediate gear 60 and thereby cause the intermediate gear 60 to rotate in the counter clock-wise direction. Intermediate gear 60, through its external teeth 72, will drive the gear 74 and therefore cause the gear 74 to rotate in the clock-wise direction. The clock-wise rotation of the gear 74 is then imparted to the driving gear 18 through the shaft 78.

Simultaneously, the interrelation between the sun gear 42, the planetary pinions 44 and the internal teeth 62 on the intermediate gear 60 causes the planetary pinions 44 to rotate in a counter-clockwise direction about their axes and to move in a clockwise direction about a sun gear 42. This clockwise movement of the pinions 44 is then transmitted through the shafts 48 to provide clockwise movement of the carrier 50 which is keyed by means of a key 52 to shaft 54. This clockwise rotation of carrier 50 is then imparted to the driving gear 19 which is carried by shaft 54.

From the foregoing, it will be readily apparent that a given input torque from the motor 22 will be divided by the torque divider 24 such that the driving gears 18 and 19 which are mounted in engagement with the rack 20 will be caused to rotate in the same direction, each imparting an equal portion of the input torque to the rack 20, and thereby effect relative movement therewith such that the tailstock or other slidable member can be moved relative to the bed portion 16.

In a preferred embodiment of this invention, the gearing means of the torque divider 24 will include a sun gear 42 having 24 teeth, planetary pinions 44 having 12 teeth, an intermediate gear 60 having 48 internal teeth and 36 external teeth and a gear 74 in engagement with the external teeth 72 of the intermediate gear 60 having 54 teeth.

In another application of the torque divider 24 of this invention the rack 20 could be disposed between the two driving gears 18, 19. However, in this arrangement an intermediate gear would have to be inserted between gears 60, 74 so that the driving gears 18, 19 could rotate in opposite directions, as would be required.

Although the torque divider of this invention has a primary application in grinding machines for shifting a slide portion relative to a bed portion, the invention is not intended to be limited to use in such an environment but rather can be used in any environment wherein an input torque is required to be divided between two driving output members.

Although only a preferred embodiment of the invention has been specifically illustrated and described herein, it is to be understood that minor variations may be made therein without departing from the spirit of the invention.

I claim:

1. In a machine tool having a slide portion movable with respect to a bed portion by means of a gear and rack arrangement, a torque divider, said torque divider comprising a first shaft for transmitting input torque, gearing means connected to said shaft for dividing the input torque, two output shafts each interconnected with said first shaft through said gearing means, driving gears carried by each of said output shafts, and said driving gears being mounted in engagement with said rack for movement relative thereto, whereby each of said driving gears is adapted to transmit an equal portion of the input torque to said rack, said gearing means including a sun gear and planetary pinion means engaged by said sun gear, and said planetary pinion means being mounted for simultaneous rotation about its own axis and about said sun gear with the input torque being transmitted to one of said two output shafts by means of the rotation of said planetary pinion means about its own axis and to the other of said two output shafts by means of the rotation of said planetary pinion means about said sun gear.

2. In the machine tool of claim 1, the rotation of said planetary pinion means about its own axis being imparted to said one of said two output shafts through an intermediate gear.

3. In the machine tool of claim 2, said intermediate gear having a set of internal teeth in engagement with said planetary pinion means and a set of external teeth in engagement with a gear which is keyed to said one of said two output shafts.

4. In the machine tool of claim 1, the rotation of said planetary pinion means about said sun gear is imparted to said other of said two output shafts through an intermediate carrier.

5. In the machine tool of claim 4, said intermediate carrier being keyed to said other of said two input shafts, and pin means fixing said planetary pinion means to said intermediate carrier.

6. A device for effecting relative movement between a rack and gears, said device comprising a torque divider, means transmitting input torque to said torque divider, gearing means for dividing the input torque, two output shafts each interconnected through said gearing means with said means transmitting input torque, driving gears carried by each of said output shafts and mounted in engagement with said rack and adapted to transmit equal portions of the input torque thereto for effecting relative movement therewith, said gearing means including a sun gear and planetary pinion means engaged by said sun gear, and said planetary pinion means being mounted for simultaneous rotation about its own axis and about said sun gear with the input torque being transmitted to one of said two output shafts by means of the rotation of said planetary pinion means about its own axis and to the other of said two output shafts by means of the rotation of said planetary pinion means about said sun gear.

7. The device of claim 6 wherein the rotation of said planetary pinion means about its own axis is imparted to said one of said two output shafts through an intermediate gear.

8. The device of claim 7 wherein said intermediate gear has a set of internal teeth in engagement with said planetary pinion means and a set of external teeth in engagement with a gear which is keyed to said one of said two output shafts.

9. The device of claim 8 wherein said intermediate carrier is keyed to said other of said two output shafts, and pin means fixing said planetary pinion means to said intermediate carrier.

10. The device of claim 6 wherein the rotation of said planetary pinion means about said sun gear is imparted to said other of said two output shafts through an intermediate carrier.

References Cited
UNITED STATES PATENTS

| | | | |
|---|---|---|---|
| 2,687,045 | 8/1954 | Schroeder | 74—410 |
| 2,737,829 | 3/1956 | Wilson | 74—710X |
| 2,946,232 | 7/1960 | Jones | 74—410X |
| 3,316,772 | 5/1967 | Jones | 74—410 |

LEONARD H. GERIN, Primary Examiner

U.S. Cl. X.R.

74—410, 705